United States Patent [19]

Amster et al.

[11] 4,359,205

[45] Nov. 16, 1982

[54] HYDRAULICALLY OPERATED LIFTING APPARATUS AND PUMP THEREFOR

[75] Inventors: Micha Amster; Gideon Shadmi, both of Kibbutz Mizra, Israel

[73] Assignee: Taamal Mizra, Kibbutz Mizra, Israel

[21] Appl. No.: 170,086

[22] Filed: Jul. 18, 1980

[51] Int. Cl.[3] .................................... B60P 1/48

[52] U.S. Cl. .................................... 254/8 B; 417/510

[58] Field of Search .................... 254/2 B, 8 B, 10 B, 254/124; 417/510, 511; 187/8, 41; 182/191

[56] References Cited

U.S. PATENT DOCUMENTS

| | | | |
|---|---|---|---|
| 1,265,240 | 5/1918 | Myers | 417/511 |
| 1,280,472 | 10/1918 | Hopkins | 254/8 B |
| 1,819,378 | 8/1931 | Nilson | 254/10 B |
| 2,136,636 | 11/1938 | Rotter | 417/511 |

FOREIGN PATENT DOCUMENTS

| | | | |
|---|---|---|---|
| 520508 | 3/1955 | Italy | 254/10 B |

*Primary Examiner*—Robert C. Watson
*Attorney, Agent, or Firm*—Cushman, Darby & Cushman

[57] ABSTRACT

Portable hydraulically operating lifting apparatus including a wheel mounted chassis, a mounting base supported on the chassis and defining first and second pivot mounting locations and a cylinder pivot mounting location, the cylinder pivot mounting location being below the first and second pivot mounting locations, a raisable element defining a planar supporting surface, first and second support elements pivotably coupled to the first and second pivot mounting locations respectively and to the raisable element, a hydraulically operated cylinder pivotably coupled to the cylinder pivot mounting location and to the raisable element and apparatus for providing a pressurized flow of hydraulic fluid to the cylinder. The apparatus is constructed for maintaining the raisable element substantially horizontal throughout its range of dispositions and for maintaining the hydraulic pressure in the cylinder substantially constant throughout the range of dispositions.

8 Claims, 5 Drawing Figures

HYDRAULICALLY OPERATED LIFTING APPARATUS AND PUMP THEREFOR

FIELD OF THE INVENTION

The present invention relates to hydraulic equipment generally, and more particularly to hydraulically operated lifting apparatus.

BACKGROUND OF THE INVENTION

Various types of hydraulically operated lifting equipment are known on the market and in the patent literature. There exist, however, various specialized applications, such as aircraft servicing, wherein the permissible size and range of movements of the apparatus is extremely limited.

SUMMARY OF THE INVENTION

The present invention seeks to provide hydraulically operated lifting equipment of extremely small size and versatility and to provide a hand-operated hydraulic pump of relatively high efficiency and reliability and which is suitable for use in applications where very little range of movement is provided.

There is thus provided in accordance with an embodiment of the present invention portable hydraulically operated lifting apparatus comprising a wheel mounted chassis, a mounting base supported on the chassis and defining first and second pivot mounting locations and a cylinder pivot mounting location, the cylinder pivot mounting location being below the first and second pivot mounting locations, a raisable element defining a planar supporting surface, first and second support elements pivotably coupled to the first and second pivot mounting locations respectively and to the raisable element, a hydraulically operated cylinder pivotably coupled to the cylinder pivot mounting location and to the raisable element and apparatus for providing a pressurized flow of hydraulic fluid to the cylinder for providing extension thereof and consequent lifting of the raisable element, the mounting locations, cylinder, support elements and raisable element being arranged such that the planar supporting surface maintains a generally horizontal disposition in lowered, raised and intermediate orientations.

Further in accordance with an embodiment of the present invention there is provided a hydraulic pump including a reservoir for hydraulic fluid; a cylinder bore communicating with the reservoir via a supply opening and having a first inner diameter; a one-way valve disposed at the supply opening for permitting entry of hydraulic fluid into the bore and preventing exit of hydraulic fluid therefrom at the supply opening into the reservoir and piston apparatus comprising a piston rod coupled to an operating handle and defining a main portin of first cross sectional area and an end portion having a second outer diameter; a first piston element having an outer diameter substantially equal to the first diameter and an inner diameter slightly greater than the second diameter, the first piston element being disposed about the end portion; a second piston element having a first portion of its outer diameter substantially equal to the first diameter and a second portion of its outer diameter defining an annual recess; resilient sealing material disposed in the annual recess, the second piston element being disposed about the end portion and having an inner diameter slightly greater than the second diameter; a hydraulic fluid passageway being defined between the end portion and the inner diameters of the first and second piston elements, a cap element mounted onto the end portion adjacent the second hydraulic seal and an annular seal associated with the cap element and being operative, when the cap element and the second piston element are forced together, to seal the passageway from the portion of the bore lying below the cap element and to permit hydraulic fluid communication from the passageway to the portion lying below the cap element when the second piston element and the cap element are not forced together.

The pump is operative such that during a stroke in a first direction so that the piston rod is retracted from the cylinder, hydraulic fluid is pumped from the cylinder pressure and drawn into the cylinder simultaneously from the reservoir while the hydraulic fluid passageway is sealed. During a stroke in the opposite direction, where the piston rod is inserted into the cylinder, the hydraulic fluid passageway is open and as hydraulic fluid is pumped from the cylinder by virtue of its decreasing available volume resulting from insertion of the piston rod thereinto, hydraulic fluid passes through the first and second hydraulic fluid passageways and equalizes pressure within the cylinder.

It may be appreciated that hydraulic fluid is pumped from the cylinder during both strokes. The relationship between the volumes pumped during the opposite strokes depends on the relationship between the cross sectional areas of the piston rod and the cylinder. In the illustrated preferred embodiment, where the cross sectional area of the piston rod is one-half of that of the cylinder, the volumes pumped in the opposite strokes are equal.

BRIEF DESCRIPTION OF THE DRAWINGS

The present invention will be more fully understood and appreciated from the following detailed description taken in conjunction with the drawing in which.

DETAILED DESCRIPTION OF A PREFERRED EMBODIMENT

Figure 1A:
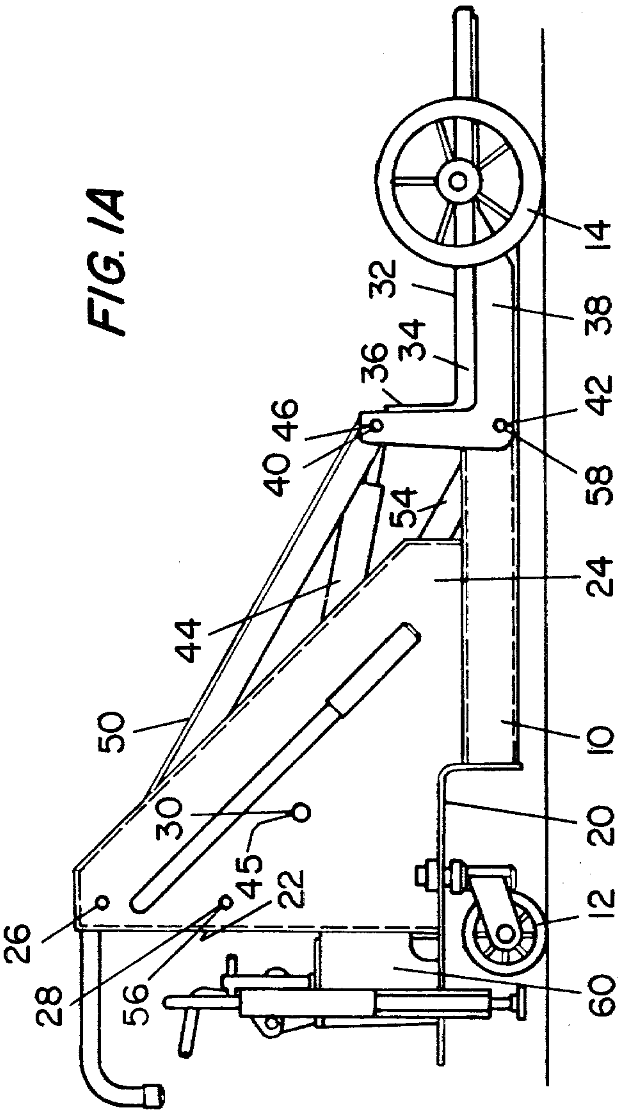
FIGS. 1A and 1B are side view illustrations of lifting apparatus constructed and operative in accordance with an embodiment of the present invention in respective fully lowered and fully raised orientations.
Figure 1B:
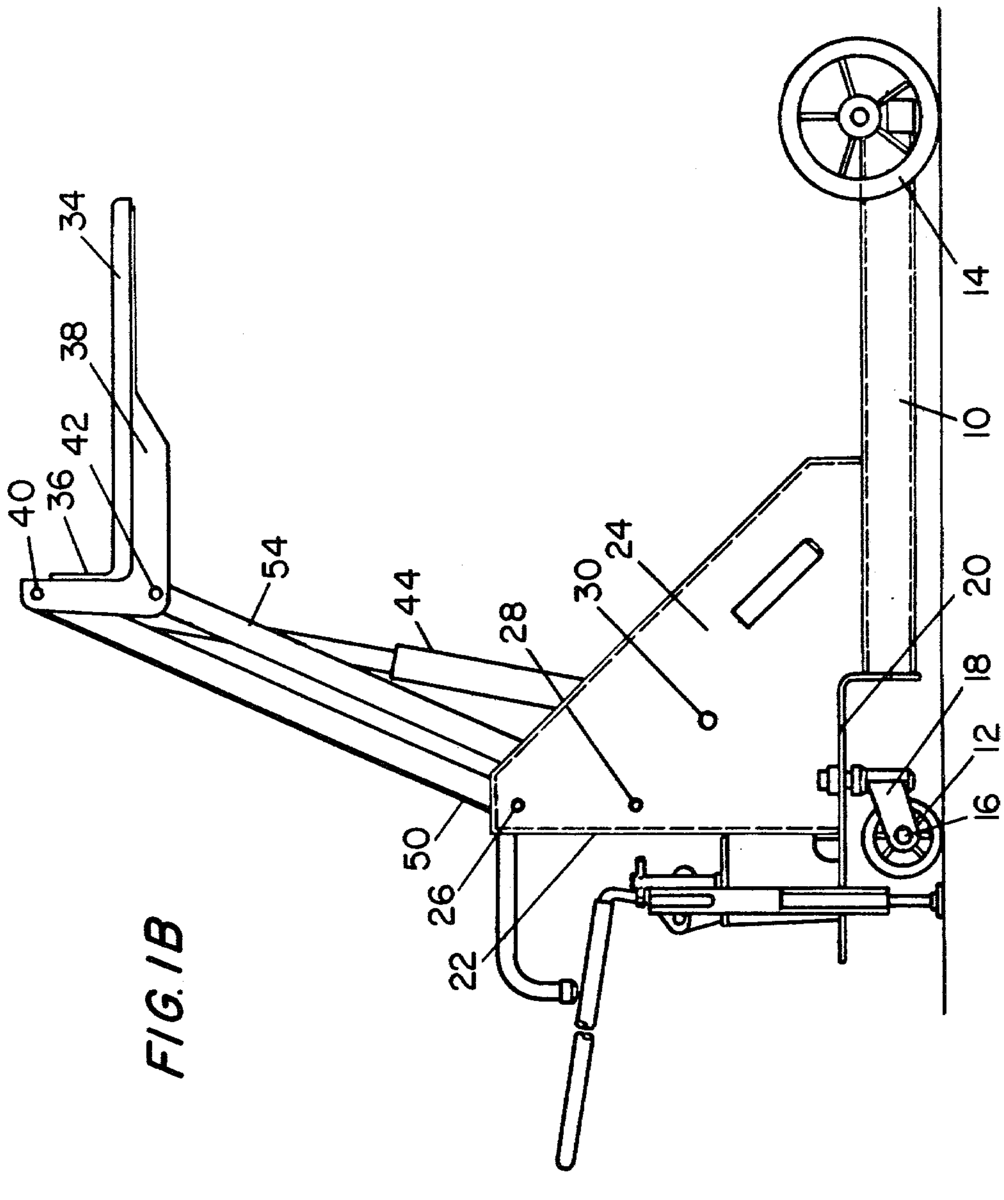
Figure 2:
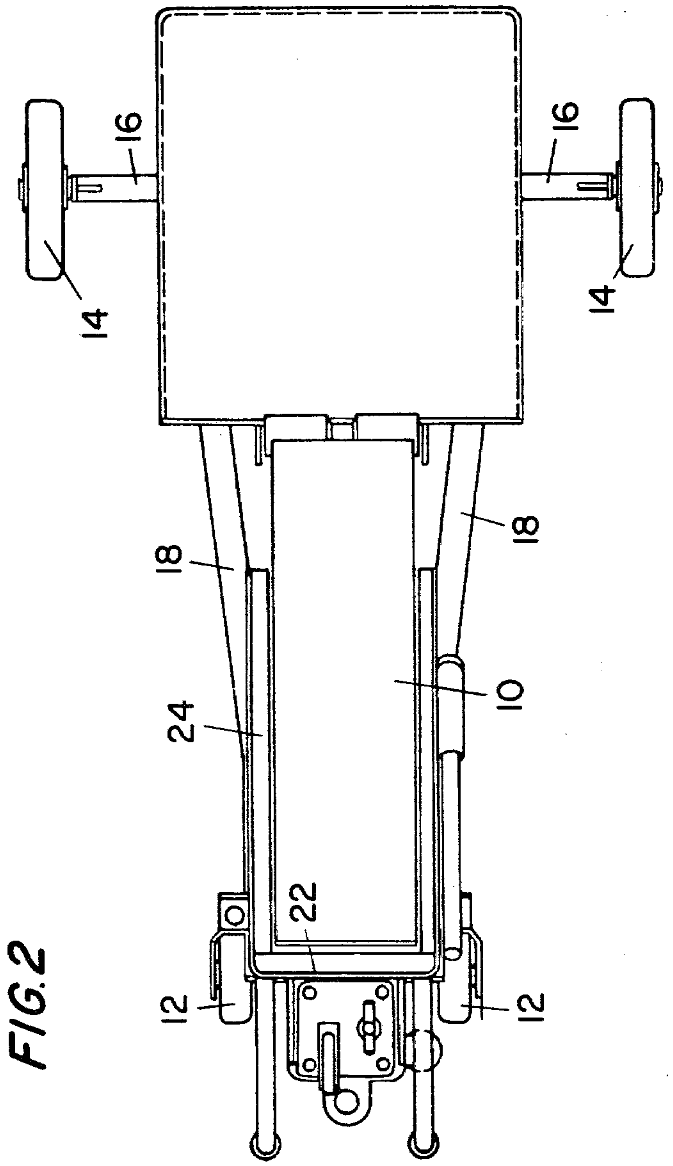
FIG. 2 is a top view illustration of the lifting apparatus of FIGS. 1A and 1B.

Reference is now made to FIGS. 1A, 1B and 2 which illustrate lifting apparatus constructed and operative in accordance with an embodiment of the present invention. The lifting apparatus comprises a chassis 10 which is supported at the rear thereof on a pair of casters 12 and which is supported at the front thereof on a pair of relatively large diameter wheels 14 which are supported on an axle 16. The length of axle 16 and the separation between adjacent wheels 14 is greater than the width of the remainder of the chassis 10. Axle 16 is supported by a pair of diagonally directed struts 18 lying in the horizontal plane and which are connected onto the rear portion of the chassis, which comprises a curved sheet of metal, 20.

Mounted on chassis 10 is a three sided upstanding structure comprising a back wall 22, and two side walls 24. Side walls 24 each define first and second pivotal mounting locations 26 and 28 which are located in the same vertical plane. A cylinder pivot mounting location 30 is defined forwardly of mounting locations 26 and 28 and therebelow, typically by a pair of support members extending forwardly of back wall 22.

A raisable element 32, typically in the form of a flat supporting surface 34 having an upstanding back surface 36 is formed with a pair of reinforced side edges 38 which lie below a portion of surface 34 and extend slightly above back surface 36. Side edges 38 each define third and fourth pivot mounting locations 40 and 42 which lie in the same vertical plane.

An extensible hydraulically operable cylinder and piston combination 44 is pivotably connected at one extreme end thereof to an axle 45 at cylinder pivot mounting location 30 and at the other extreme end thereof is pivotably connected to an axle 46 mounted at third pivot mounting locations 40. A first support element, in the form of an elongate plate member 50 is pivotably connected at one extreme end thereof to an axle 52 mounted onto first pivot mounting location 26 and at a second extreme end thereof to axle 46 connected at third pivot mounting locations 40.

A pair of second support elements 54 are connected at one extreme end thereof to an axis 56 located at the second pivot mounting locations 28 and at the opposite ends thereof to an axis 58 located at the fourth pivot mounting locations 42.

It is a particular feature of the present invention that during the raising and lowering thereof and at both extreme raised and lowered positions, the supporting surface 34 is maintained in a generally horizontal orientation. This is accomplished by means of a particular selection of the locations of the first, second, third and fourth pivot mounting locations and of the cylinder pivot mounting location. One preferred embodiment of the placement of these locations is indicated in FIGS. 1A, 1B and 2 which are drawn to scale.

It is another particular feature of the present invention that the total height of the apparatus when in a lowered orientation is only 85 centimeters, while it is capable of lifting a load of up to 400 kg. up to a height of 1550 centimeters at a 60 cm load center. This enables the apparatus to fit underneath certain types of aircraft and to perform functions that otherwise had to be carried out by hand.

It is an important feature of the present invention that the hydraulic pressure in the cylinder and piston combination 44 remains constant irrespective of the position of the raisable element. This feature enables simplified construction of the apparatus and enables a safety pressure release valve to be set at a single valve for all operations.

Cylinder and piston combination 44 is operated by a hydraulic pump 60 which is connected thereto by a conduit (not shown). Any suitable conventional hydraulic pump may be used. However, in accordance with a preferred embodiment of the present invention there is provided a hydraulic pump which is particularly efficient and easy to operate in confined areas. This hydraulic pump is illustrated in FIGS. 3 and 4.

Figure 3:
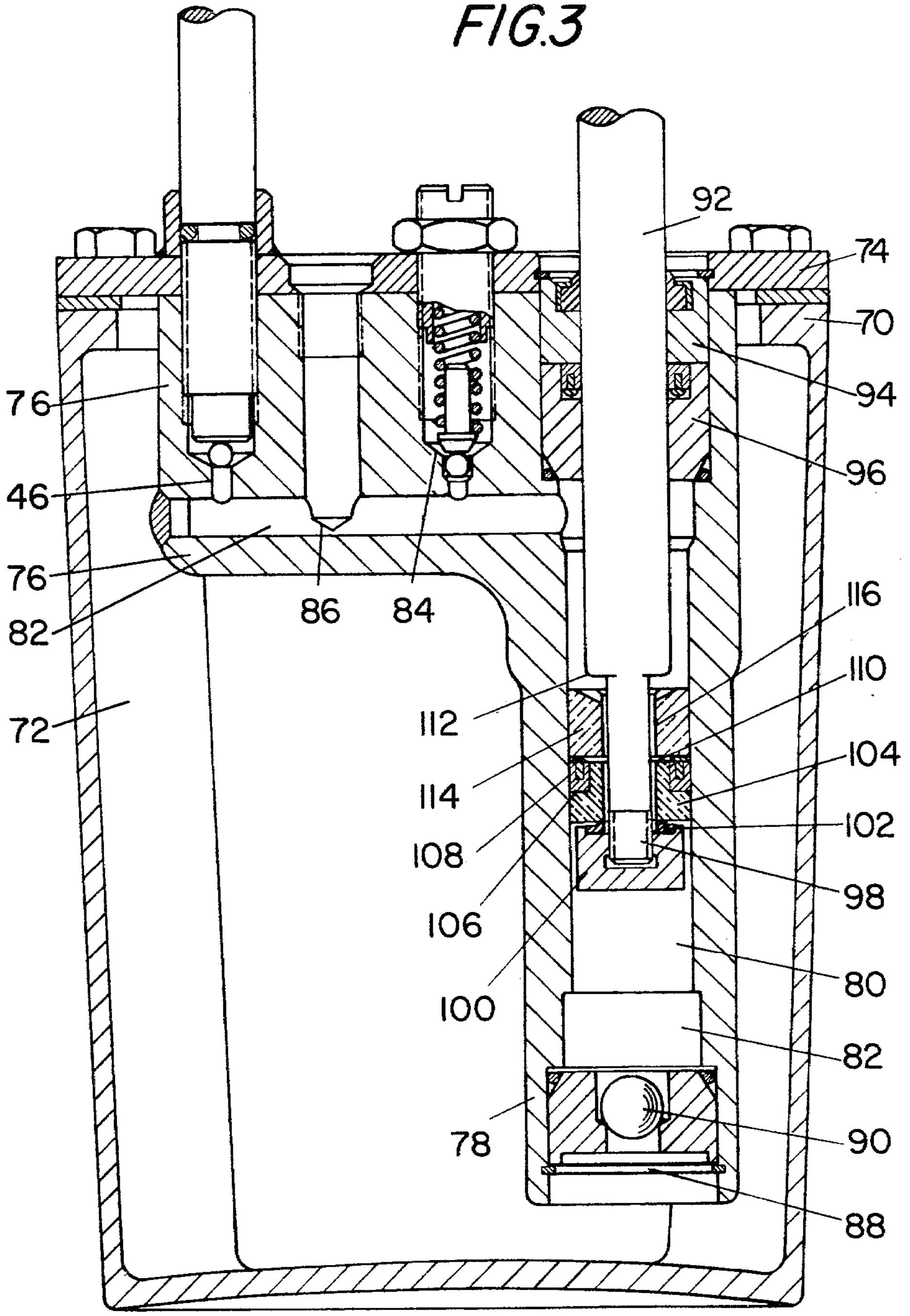
FIG. 3 is a side view sectional illustration of a hydraulic pump useful in the lifting apparatus of FIGS. 1A, 1B and 2.
Figure 4:
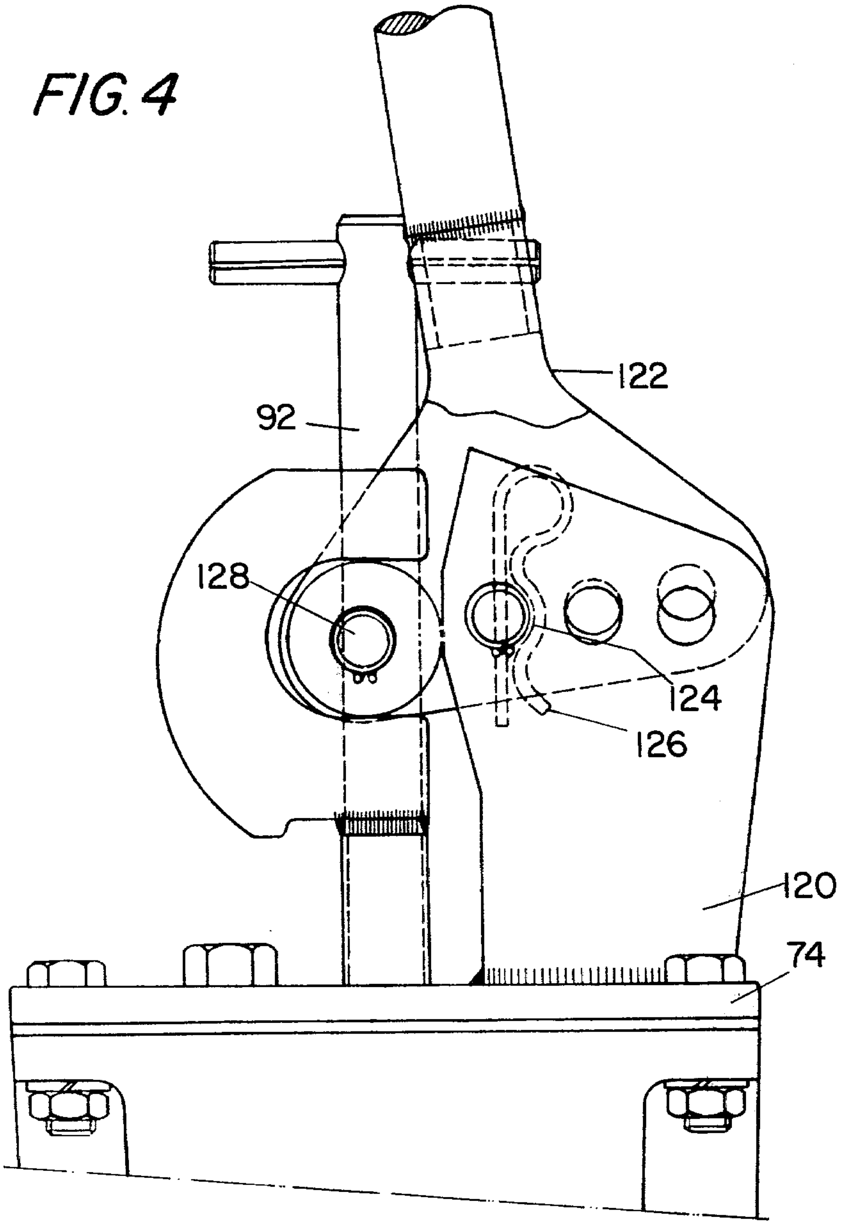
FIG. 4 is a side view, sectional illustration of a pump handle mounting arrangement useful with the pump and lifting apparatus of the present invention.

Reference is now made to FIG. 3 which illustrates the construction and operation of the pump. The pump comprises a housing 70 of generally cylindrical configuration which defines a reservoir 72. A cover member 74 seals the reservoir and supports an inner member 76 which defines an elongate passage 78 part of which constitutes a circular cylinder 80. Cylinder 80 communicates via a passage 82 with a conventional adjustable relief valve assembly 84, a delivery port 86 which may be connected to a hydraulic cylinder, such as cylinder and piston combination 44 for operation thereof and a manually operated release valve assembly 46 comprising a ball valve. Passage 82 terminates in a plug which separates it from communication with the interior of reservoir 72.

Passage 78 communicates with the reservoir at a bottom open end thereof via a screen filter 88 and a one way ball valve assembly 90. A piston rod 92 is disposed in passage 78 and is sealed with respect to the top portion of the passage, communicating with the outside atmosphere by a pair of bushings 94 and 96 each of which defines a recess adjacent its inner diameter in which is placed a resilient annular seal for enhanced sealing against release of hydraulic fluid.

Piston rod 92 is formed as a main portion having a cross sectional area which preferably is equal to one-half of the cross sectional area of cylinder 80 and terminates in an end portion 98 of relatively smaller cross section and is attached at its extreme end to a cap member 100 having an outer diameter smaller than the inner diameter of cylinder 80 and a recess adjacent its inner diameter in which is disposed an annular seal 102. According to a preferred embodiment of the present invention, annular seal 102 is of the type commonly known as USIT. One example of such a seal is manufactured by Simrit of West Germany. The USIT type seal comprises a metal outer ring onto which is mounted a rubber inner ring which extends axially outward of the outer ring such that when it is compressed in an axial direction it expands radially inward. The particular usefulness of this seal will be described hereinafter.

Disposed about end portion 98 above cap member 100 is a first piston element 104 having an outer diameter which is substantially the same as the inner diameter of cylinder 80 so as to provide sealed sliding engagement therebetween. Piston element 104 is formed with an annular recess 106 adjacent its top outer edge in which is disposed a resilient annular sealing ring 108. Sealing ring 108 comprises two portions, a base formed of a reinforced resilient material and a protruding portion 110. Sealing ring 108 provides a good seal between piston element 104 and the inner surface of cyliner 80 when pressure is applied thereto by hydraulic fluid located interiorly thereof during upward travel of the piston rod 92.

Disposed about end portion 98 above first piston element 104 and below a shoulder 112 at which end portion 98 widens into the main portion of the piston rod is a second piston element 114 having an outer diameter which is substantially the same as the inner diameter of cylinder 80.

It is noted that the first and second piston elements 104 and 114 are both annular members, typically formed of metal and are each formed with an axial bore of diameter which is slightly greater than the outer diameter of end portion 98 thereby to permit the passage of hydraulic fluid therepast and thus provide communication between the volume above piston element 114 and the volume below cap member 100. This communication is permitted except when cap member 100 and piston element 104 are forced together thus providing a seal at the inner bottom edge of piston element 104 by means of annular seal 102.

The operation of the pump will be described briefly hereinbelow. When piston rod 92 is forced downwardly in the sense illustrated in FIG. 3, i.e. inserted into the cylinder 80, the shoulder 112 of the piston rod engages the top of piston element 114 forcing it downward. Piston element 114 is formed with a bevelled inner top edge so that when shoulder 112 engages it, the communication between the passageway 116 defined adjacent the inner surfaces of piston elements 104 and 114 and the volume lying thereabove is not prevented.

As the piston rod 92 is inserted into the cylinder, it reduces the available volume for hydraulic fluid in the cylinder. Since hydraulic fluid cannot exit via the one way valve 90, it is forced out of the cylinder via delivery port 86. In the preferred embodiment of the invention illustrated in FIG. 3 where the cross sectional area of the piston rod main portion 92 is equal to half of the cross sectional area of the cylinder, a volume of hydraulic fluid equal to one-half of the cylinder volume traversed by the piston stroke is pumped out during each insertion stroke of the piston rod 92. As seal element 104 is urged downwardly it is spaced from cap member 100, such that annular seal 102 does not block communication of hydraulic fluid from the volume below the cap member to the volume above seal member 114. Therefore during the downward motion of the piston rod, hydraulic fluid moves through passageway 116 and the pressure of the fluid in the cylinder is maintained constant in both volumes.

The upward movement of piston rod 92 causes cap member 100 to force itself against seal element 104 thereby causing annular seal 102 to effectively seal passageway 116 and prevent the flow of hydraulic fluid therethrough. The continued upward movement of piston rod 92 increases the pressure on the hydraulic fluid in the volume lying above seal member 114 and forces hydraulic fluid out through coupling socket 86. At the same time, negative pressure is generated below cap member 100, drawing hydraulic fluid from the reservoir via one way valve assembly 90 into cylinder 80. Thus cylinder 80 is always filled with hydraulic fluid.

In the preferred embodiment of the invention in which the cross sectional area of the piston rod main portion is equal to one half of the cross sectional area of the cylinder, the amount of hydraulic fluid pumped out of the cylinder during each retraction, i.e. upward, stroke of the piston rod is equal to one-half the volume of the cylinder traversed by the piston stroke and therefore the volumes of hydraulic fluid pumped in the opposite insertion and retraction strokes are equal. Should unequal volumes be desired, the relationship between the cross sectional area of the piston main portion and the cylinder is selected accordingly.

The mechanism for operating the piston rod will now be described in connection with FIG. 4. FIG. 4 shows a pivot mounting member 120 upstanding from pump cover member 74. Pivot mounting member 120 defines three pivot holes for selectable engagement with a pivot handle 122 via a pin 124, which is secured in place with a non-slip cotter pin 126. Pivot handle 122 is also formed with three pivot holes corresponding to the pivot holes in member 120. Three different holes are provided to provide a selection of different amounts of lever advantage desired, corresponding to selectably different pressure levels which may be realized by the same operator force exertion.

Pivot handle 122 is pivotably mounted onto piston rod 92 by means of a pivot pin 128 for driving up and down operation thereof in response to up and down pivotal motion of pivot handle 122 about pin 124. It is appreciated that in accordance with a preferred embodiment of the present invention, the pivot handle 122 may be configured to have a curved extension 130, as seen, for example, in FIG. 1B. This feature enables operation of the hydraulic pump in extremely close quarters.

It is a particular feature of the construction illustrated in FIG. 4 that side forces produced during operation of the pump are in the main not transferred to the piston rod. Furthermore, element 120 is constructed to act as a stop at the end of the piston travel cycle in order to prevent impacts from being transmitted to the piston rod. This feature greatly adds to the lifetime of the various seals and piston components.

It is also a particular feature of the present invention that piston elements 104 and 114 are loosely fitting about end portion 98. This enables substantial economies in manufacture since high tolerance machining of the bores in elements 104 and 114 is not required.

The invention is not limited by what has been specifically shown and described hereinabove. Rather the scope of the present invention is defined only by the claims which follow:

We claim:

1. Portable hydraulically operated lifting apparatus comprising:

a wheel mounted chassis;

a mounting base supported on said chassis and defining first and second pivot mounting locations and a cylinder pivot mounting location;

said cylinder pivot mounting location being below the first and second pivot mounting locations;

a raisable element defining a planar supporting surface;

first and second support elements pivotably coupled to said first and second pivot mounting locations respectively and to said raisable element;

a hydraulically operated cylinder pivotably coupled to said cylinder pivot mounting location and to said raisable element; and means for supplying a pressurized flow of hydraulic fluid to said cylinder for providing extension thereof and consequent lifting of said raisable element, said supplying means comprising a hydraulic pump including;

a reservoir for hydraulic fluid;

a cylinder bore communicating with said reservoir via a supply opening and having a first inner diameter;

first one way valve means disposed at said supply opening for permitting entry of hydraulic fluid into said bore and preventing exist of hydraulic fluid therefrom at said supply opening into said reservoir; and second one way valve means communicating with said cylinder bore at an outlet location located at the opposite end of said cylinder bore from said supply opening;

piston means comprising a piston rod coupled to an operating handle and defining an intermediate portion having a second outer diameter and an end portion disposed within said bore, said end portion having a third outer diameter;

first and second piston elements slidably disposed about said end portion, having an outer diameter slightly less than said first inner diameter and having inner diameters slightly greater than said third outer diameter and defining a hydraulic fluid passageway between said end portion and the inner diameters of said first and second piston elements;

a cap element mounted onto said end portion adjacent said second piston element; and an annular seal associated with said cap element and being operative during outward motion of said piston rod with respect to said bore away from said supply opening when said cap element and said second piston element are forced together by the hydraulic fluid pressure between said cap element and said outlet location, to seal said hyraulic fluid passageway from the portion of said bore lying between said cap element and said supply opening, and thereby to force hydraulic fluid from said cylinder bore via said second one way valve means, said annular seal being operative during inward motion of said piston rod with respect to said bore towards said supply opening, when said cap element and said second piston element are not forced together to permit hydraulic fluid communication from said cylinder bore via said hydraulic fluid passageway thereby forcing hydraulic fluid from said cylinder bore via said second one way valve means as said piston rod displaces hydraulic fluid in said cylinder bore.

2. Apparatus according to claim 1 and wherein said second outer diameter and said first inner diameter are selected such that the cross sectional area of said intermediate portion is one half of the cross sectional area of said cylinder bore such that equal amounts of fluid are pumped during inward and outward motion of said piston rod.

3. Apparatus according to claim 1 and wherein said second piston element also comprises second sealing means operative to provide an enhanced seal betetween said second piston element and said cylinder bore when said first and second piston elements are forced together.

4. Apparatus according to claim 1 and wherein the arrangement of said first and second support elements, said raisable element and said cylinder are arranged such that the compressive force applied to said sylinder for a given load is substantially constant along the entire range of possible orientations of said raisable element.

5. Apparatus according to claim 1 wherein said mounting locations, cylinder, support elements and raisable elements are arranged such that said planar supporting surface is maintained in a generally horizontal disposition in lowered and raised orientations and in orientations intermediate therebetween.

6. Apparatus according to claim 1 and wherein said raisable element defines third and fourth pivot mounting locations which are oriented in a vertical plane.

7. Apparatus according to claim 3 and wherein said first support element and said cylinder are pivotably connected to said raisable element at said third pivot mounting location.

8. Apparatus according to claim 1 and wherein said chassis comprises diagonally directed struts supporting a pair of wheels at the front of said apparatus which are separated by a greater distance than the separation of a pair of wheels located at the rear of said apparatus.

* * * * *